(12) United States Patent
Ye et al.

(10) Patent No.: US 11,565,830 B2
(45) Date of Patent: Jan. 31, 2023

(54) METHOD FOR CALCULATING OPTIMAL WHEEL POSITION CONTROL ANGLE OF PASSENGER BOARDING BRIDGE AUTOMATIC DOCKING SYSTEM

(71) Applicant: University of Electronic Science and Technology of China, Chengdu (CN)

(72) Inventors: Run Ye, Chengdu (CN); Bin Yan, Chengdu (CN); Cheng Zhang, Chengdu (CN); Xuemei He, Chengdu (CN); Xiaojia Zhou, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 216 days.

(21) Appl. No.: 17/169,478

(22) Filed: Feb. 7, 2021

(65) Prior Publication Data

US 2021/0339886 A1 Nov. 4, 2021

(30) Foreign Application Priority Data

Apr. 30, 2020 (CN) .......................... 202010363994.9

(51) Int. Cl.
*B64F 1/30* (2006.01)
*B64F 1/305* (2006.01)

(52) U.S. Cl.
CPC .................................. *B64F 1/3055* (2013.01)

(58) Field of Classification Search
CPC .............................. B64F 1/305; B64F 1/3055
USPC .......................................................... 14/71.5
See application file for complete search history.

(56) References Cited

U.S. PATENT DOCUMENTS

| 3,462,784 | A | * | 8/1969 | Seipos | B64F 1/3055 |
| | | | | | 180/234 |
| 3,577,838 | A | * | 5/1971 | Van Marle | B64F 1/305 |
| | | | | | 14/71.5 |
| 3,683,440 | A | * | 8/1972 | Xenakis | B64F 1/3055 |
| | | | | | 14/71.5 |
| 3,808,626 | A | * | 5/1974 | Magill | B64F 1/3055 |
| | | | | | 14/71.5 |
| 4,318,198 | A | * | 3/1982 | Drozd | B64F 1/3055 |
| | | | | | 14/71.5 |
| 5,855,035 | A | * | 1/1999 | Streeter | B64F 1/305 |
| | | | | | 14/72.5 |

(Continued)

*Primary Examiner* — Raymond W Addie
(74) *Attorney, Agent, or Firm* — Matthias Scholl P.C.; Matthias Scholl

(57) ABSTRACT

A method for calculating an optimal wheel position control angle of passenger boarding bridge automatic docking system includes collecting ranging information of a sensor to rotate the bridgehead direction via a distance measuring sensor on both sides of the bridgehead of the passenger boarding bridge, making the bridgehead parallel to the aircraft fuselage; collecting information of an aircraft door by a camera at the bridge head of the passenger boarding bridge to obtain a center position D of the aircraft door; in an ideal docking situation, the aircraft door should appear at the bridge head position as D"; the position where D" is projected vertically onto the aircraft fuselage is D', that is, the line segment DD' is the horizontal distance deviation between the current passenger boarding bridge and the aircraft door, the line segment D'D" is the distance between the current boarding bridge and the aircraft fuselage.

1 Claim, 9 Drawing Sheets

(56) References Cited

U.S. PATENT DOCUMENTS

| | | | | |
|---|---|---|---|---|
| 7,458,122 B2* | 12/2008 | Hutton | ............... | B64F 1/305 |
| | | | | 340/686.2 |
| 7,603,737 B2* | 10/2009 | Hutton | ............... | B64F 1/3055 |
| | | | | 340/686.2 |
| 7,979,937 B2* | 7/2011 | Tomioka | ............... | B64F 1/305 |
| | | | | 14/72.5 |

* cited by examiner ions should be directed
METHOD FOR CALCULATING OPTIMAL WHEEL POSITION CONTROL ANGLE OF PASSENGER BOARDING BRIDGE AUTOMATIC DOCKING SYSTEM

CROSS-REFERENCE TO RELATED APPLICATIONS

Pursuant to 35 U.S.C. § 119 and the Paris Convention Treaty, this application claims foreign priority to Chinese Patent Application No. 202010363994.9 filed Apr. 30, 2020, the contents of which, including any intervening amendments thereto, are incorporated herein by reference. Inquiries from the public to applicants or assignees concerning this document or the related applicatto: Matthias Scholl P. C., Attn.: Dr. Matthias Scholl Esq., 245 First Street, 18th Floor, Cambridge, Mass. 02142.

BACKGROUND

The disclosure relates to the field of automatic control field. Specifically, it relates to a method of calculating the wheel frame walking strategy based on using feedback information extracted from a visual sensor and the current attributes of the passenger boarding bridge in the automatic docking of the boarding bridge.

A boarding bridge is a movable passage which commonly extends from a terminal building (or an airplane terminal gate) to an airplane, allowing passengers to board and disembark.

At present, the docking and evacuation of passenger boarding bridges are controlled by operators in manual mode. The operation process of passenger boarding bridges is very complicated, which places high requirements on the operating skills of operators.

Improper operation can cause very serious problems, such as deformation or damage of the aircraft fuselage, damage of the engine cowling, etc. In addition, the training and management of passenger boarding bridge operators also require higher costs. Therefore, it is necessary to realize the automatic docking of the boarding bridge.

If the boarding bridge can realize automatic docking, it will be more efficient and safer than manual docking. In the intelligent automatic docking of boarding bridges, people have explored in many ways how to realize the automatic docking of boarding bridges, but so far, no practical application has been found.

With the continuous development of computer vision technology and automation control technology, it is possible to automate the docking of the boarding bridge. After consulting a large number of studies, no walking control strategy for the automatic docking system of passenger boarding bridges was found. Therefore, it is necessary to timely study a set of methods for calculating wheel frame control strategies for the passenger boarding bridge automatic docking system.

The purpose of the disclosure is to propose a method for calculating the optimal wheel position control angle of the passenger boarding bridge docking with the aircraft door. By modeling the process of passenger boarding bridge docking with aircraft door, and calculating the best walking angle according to the current state attributes of passenger boarding bridge to improve docking efficiency.

SUMMARY

The disclosure proposes a method for calculating the optimal wheel position control angle of a boarding bridge docking an aircraft door, which needs to ensure the following three premises.

Ensuring that the bridgehead of the boarding bridge is at the same height as the aircraft door and that the bridgehead is parallel to the aircraft fuselage (that is, the outer edge of the boarding bridge is parallel to the aircraft fuselage). This premise can be achieved by installing distance detection sensors (such as ultrasonic sensors) on the left and right sides of the bridgehead, and adjusting the angle of the bridgehead so that the distance measurement values of the two ultrasonic sensors are the same to achieve the bridgehead parallel to the aircraft fuselage.

Obtaining the relative position of the door of the aircraft to be docked and the bridgehead of the passenger boarding bridge through visual sensors or other methods. This premise can be achieved by installing a visual sensor on the inner side of the boarding bridge head (the disclosure is to install a visual sensor to obtain the relative distance between the bridge head and the aircraft door). Using vision to locate the aircraft door, and using a camera ranging method (such as the principle of Monocular Ranging, the RGBD camera with depth information, the principle of binocular distance measurement, etc.) to calculate the relative position of the bridge head of the boarding bridge and the aircraft door.

Measuring and obtaining the current attribute information of the passenger boarding bridge via sensors, the specific process is as follows:

(1) The straight-line distance from the center point of the wheel frame of the boarding bridge to the center point of the bridgehead (fixed value)

(2) The length of the boarding bridge body can be obtained by the distance sensor that comes with the boarding bridge (change value)

(3) The bridgehead angle of the boarding bridge can be obtained by the bridgehead angle sensor that comes with the boarding bridge (change value)

Under the above three premises, the process of docking the boarding bridge with the cabin door is analyzed. Because the control angle of the boarding bridge wheel position is the angle in the horizontal direction, the horizontal direction of the boarding bridge docking process is analyzed and modeled.

The boarding bridge docking model is shown in FIG. 1. The solid line in the figure depicts the precise docking state of the passenger boarding bridge, and the dotted line in the figure depicts the expected state after the passenger boarding bridge is successfully docked (that is, the passenger boarding bridge is docked on the aircraft door as standard). The two states and the process between them of the passenger boarding bridge all meet the first premise. Among them, point P is the position of the bridge column, M and M' are the positions of the wheel frame of the bridge, H and H' are the center of the bridgehead, and C and C' are the positions of the bridgehead where the camera is installed (Premise 2 is satisfied). In FIG. (1), D is the actual position of the airplane door, D' is the position where the current bridgehead is facing the aircraft, and D" is the position where the airplane door should appear at the bridgehead under ideal conditions of docking. The line segment DD" is easy to see from the FIG. 1, which is parallel and equal to line segment C'C and line segment H'H. Based on the above conclusions, it is not difficult to see from the FIG. 1 that the connection between the center point of the wheel frame at the desired docking position and the center point of the current wheel position (line segment MM') is the best walking path for the wheel frame of the boarding bridge (the shortest walking distance). So the angle ∠HMM' between the connection and the bridge body is the best control angle for the wheel position of the boarding bridge. Controlling the wheel frame angle of the boarding bridge to drive the boarding bridge to travel in a straight line can make the boarding bridge dock with the aircraft door in the shortest path.

In order to calculate the target wheel frame angle ($\angle M'MH$), the length of D'D" in the right triangle $\Delta DD'D"$ is measured by the bridgehead distance sensor, and the length of DD' is obtained by the vision sensor. So, the length of DD" and the size of $\angle DD'D"$ can be obtained from the Pythagorean theorem and the law of cosines. The specific calculation process is as follows:

Known: the length of DD' and D'D" in the right angle $\Delta DD'D"$ is known

Solving: the length of the line segment DD" and the angle of $\angle DD"D'$

From the Pythagorean theorem:

$$DD"=\sqrt{DD'^2+D'D"^2}$$

Obtained by the law of cosines:

$$\sin\angle DD"D' = \frac{DD"^2 + D'D"^2 - DD'^2}{2*DD"*D'D"}$$

$$\angle DD"D' = \arcsin\left(\frac{DD"^2 + D'D"^2 - DD'^2}{2*DD"*D'D"}\right)$$

The 110 DD'D" solved in the above process is equal to the bridge head offset angle $\angle A$ in FIG. 1 (the two angles are parallel), and the bridge head angle $\angle B$ can be directly measured by the sensor (Premise 3 is satisfied). In order to analyze and solve the target wheel frame angle, $\Delta PMHH'M'$ is extracted from FIG. 1 for analysis, as shown in FIG. 2. However, according to the actual position of the cabin door and the different distribution of the pillars on both sides of the bridge head, there are the following five categories which is shown in FIGS. 3-7:

1. When the actual position of the aircraft door and the pillar are on the same side of the center point of the bridgehead as shown in FIG. 3, the outer angle $\angle O$ of $\Delta PMHH'M'$ is equal to the sum of the bridgehead offset angle $\angle A$ and the bridgehead angle $\angle B$.

2. When the actual position of the aircraft door and the pillar are on both sides of the center point of the bridgehead as shown in FIG. 4, the outer angle $\angle O$ of $\Delta PMHH'M'$ is equal to the absolute value of the difference between the bridgehead offset angle $\angle A$ and the bridgehead angle $\angle B$.

3. As shown in FIG. 5, when the bridgehead of the passenger boarding bridge is facing the actual position of the aircraft door, but the pillar is on the left side of the bridgehead, the outer angle $\angle O$ of $\Delta PMHH'M'$ is equal to the bridgehead angle $\angle B$.

4. As shown in FIG. 6, when the boarding bridge body angle and the bridgehead angle are zero, the actual aircraft door may be on the left or right side of the bridgehead. In this case, the outer angle $\angle O$ is equal to the bridgehead offset angle $\angle A$.

5. As shown in FIG. 7, when the boarding bridge body angle and the bridgehead angle are zero and the bridgehead is also facing the actual aircraft door, in this case, the bridgehead offset angle $\angle A$ and bridgehead angle $\angle B$ are both equal to zero, then the outer angle $\angle O$ is also equal to zero.

Extracting $\Delta PMHH'M'$ from FIG. 1 for analysis which is shown in FIG. 2. Under the condition that $\Delta PMHH'M'$ satisfies premise 3, MH is equal to the M'H', and the outer angle $\angle O$ of $\Delta PMHH'M'$ is equal to $\angle A$ plus $\angle B$ (taking the situation in FIG. 3 as an example to illustrate the specific calculation process). Using the law of trigonometric sine and cosines which can calculate the target wheel carrier angle $\angle HMM'$. The specific calculation process is as follows:

Known: In $\Delta PMHH'M'$, the length of PH, MH, M'H', HH' and the outer angle $\angle O$ are known, and MH=M'H'.

Solving: angle $\angle HMM'$

In the triangle $\Delta PHH'$, from the law of cosines:

$$(PM'+M'H')^2=(PH)^2+HH'^2-2*(PH)*HH'*\cos(\pi-\angle O)$$

$$PM'=\sqrt{(PH)^2+HH'^2-2*(PH)*HH'*\cos(\pi-\angle O)}-M'H'$$

From the law of sines:

$$\frac{HH'}{\sin\angle HPH'} = \frac{PM' + M'H'}{\sin(\pi - \angle O)}$$

$$\angle HPH' = \arcsin\left(\frac{HH'*\sin(\pi - \angle O)}{PM' + M'H'}\right)$$

$$\angle MPM' = \angle HPH'$$

In the triangle $\Delta PMM'$:

$$MM'^2 = (PH - MH)^2 + PM'^2 - 2*(PH - MH)*PM'*\cos\angle MPM'$$

$$MM' = \sqrt{(PH - MH)^2 + PM'^2 - 2*(PH - MH)*PM'*\cos\angle MPM'}$$

$$\frac{PM'}{\sin\angle PMM'} = \frac{MM'}{\sin\angle MPM'}$$

$$\angle PMM' = \arcsin\left(\frac{PM'*\sin\angle MPM'}{MM'}\right)$$

$$\angle HMM' = \pi - \angle PMM'$$

Simplify the above steps into a functional expression using only known quantities PH, MH, HH', $\angle O$:

$$\angle HMM' = \pi - \arcsin\left(\frac{HH'*\sin(\pi - \angle O) - \frac{MH*HH'*\sin(\pi - \angle O)}{\Sigma}}{(PH-MH)^2 + (\Sigma - MH)^2 - 2*(PH - MH)*(\Sigma - MH)*\sqrt{1 - \frac{(HH'*\sin(\pi - \angle O))^2}{\Sigma^2}}}\right)$$

In the above formula:

$$\Sigma=\sqrt{(PH)^2+HH'^2-2*(PH)*HH'*\cos(\pi-\angle O)}$$

Through the above analysis and calculation process, the angle of the target wheel frame angle ($\angle HMM'$) is obtained, which is the best wheel frame angle for controlling the docking of the boarding bridge under the above scenario.

The method for calculating the optimal wheel position control angle of a boarding bridge docking an aircraft door, comprising the steps of:

Step 1: Realizing premise 1 of this technology so that the bridgehead is parallel to the fuselage of the aircraft. Specific steps are as follows:

1. Installing a distance measuring sensor (such as an ultrasonic distance measuring sensor) on both sides of the bridgehead of the passenger boarding bridge, respectively. The recommended installation position is shown in FIG. 8.

2. Collecting the ranging information of the sensors to rotate the bridgehead direction, making the bridgehead parallel to the aircraft fuselage.

3. Judging whether the bridgehead is parallel to the fuselage by comparing the measured values of the two distance measuring sensors. The standard is shown in FIG. 1.

Step 2: Realizing premise 2 of this technology, installing a camera on the bridgehead to locate the position of the aircraft door relative to the bridgehead. Specific steps are as follows:

1. Installing a camera on the bridgehead. The installation position of the camera should be such that when the docking is completed, the center of the aircraft door coincides with the center of the camera picture, and the picture is placed in a horizontal and vertical direction (not inclined). The recommended installation location is shown in FIG. 8.

2. Using machine learning, image processing and other methods to locate the precise position of the center of the aircraft door in the screen.

3. According to the distance measurement method such as monocular distance measurement principle or binocular distance measurement principle, the distance value of the deviation of the aircraft door in the horizontal direction is calculated as DD'.

4. Recording the distance from the current bridgehead to the aircraft as D'D".

Step 3: Calculating the bridgehead tilt angle ∠DD"D' size and DD" length according to the following formula.

$$DD'' = \sqrt{DD'^2 + D'D''^2}$$

$$\angle DD''D' = \arcsin\left(\frac{DD''^2 + D'D''^2 - DD'^2}{2*DD''*D'D''}\right)$$

Step 4: Achieving premise 3 of this technology, measuring the horizontal distance from the center point of the wheel frame to the center point of the bridgehead and recording it as MH. Measuring the current bridge length and recording as PH. Measuring and recording the bridgehead angle as ∠B.

Step 5: Calculating the best wheel position control angle based on the results of the above steps. The specific calculation is as follows:

$$HH' = DD'', \angle A = \angle DD''D', \angle O = \angle A + \angle B$$

Then the four parameters of PH, MH, HH' and outer angle ∠O are all known. ∠HMM' can be obtained by the following formula which is the optimal wheel position control angle.

$$\angle HMM' = \pi - \arcsin\left(\frac{HH'^*\sin(\pi - \angle O) - \frac{MH^*HH'^*\sin(\pi - \angle O)}{\Sigma}}{(PH - MH)^2 + (\Sigma - MH)^2 - 2^*(PH - MH)^*(\Sigma - MH)^*\sqrt{1 - \frac{(HH'^*\sin(\pi - \angle O))^2}{\Sigma^2}}}\right)$$

In the above formula:

$$\Sigma = \sqrt{(PH)^2 + HH'^2 - 2^*(PH)^*HH'^*\cos(\pi - \angle O)}$$

Step 6: After adjusting the wheel frame angle of the passenger boarding bridge calculated in step 5, the wheel frame is controlled to move forward and straight, and the bridgehead is automatically adjusted to make the bridgehead parallel to the aircraft fuselage according to the distance measuring sensors on both sides of the bridgehead. Controlling the boarding bridge to stop moving when the bridgehead is 5 cm away from the aircraft, and the docking ends.

The disclosure is mainly applied in the scenario where the automatic driving of the boarding bridge docks with the aircraft door, and requires certain hardware facilities and environment. When the data collected by the sensor is accurate, the disclosure can accurately calculate the optimal control angle of the wheel position, improve efficiency for docking, and avoid the situation of repeatedly operating the wheel position. In the disclosure, the optimal control angle of the wheel position can be obtained by only one calculation. In addition, the disclosure can perform multiple calculations during the docking process to reduce the deviation caused by the measurement accuracy of the sensor and improve the docking accuracy of the cabin door. After actual testing, the optimal wheel position control angle calculated by the disclosure can be more accurately docked with the hatch.

Figure 1:
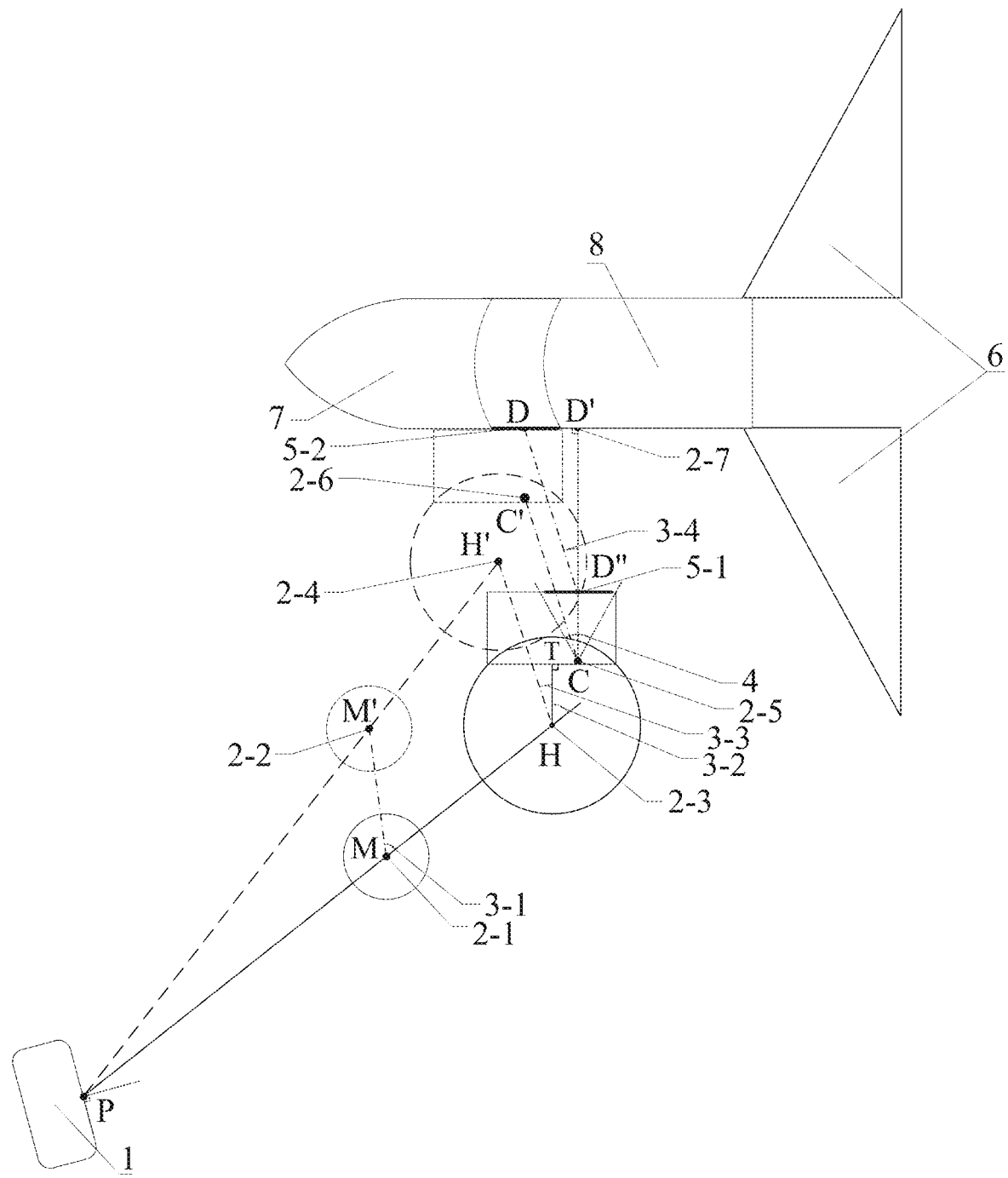
FIG. 1 is a model diagram of the boarding bridge docking process.
Figure 2:
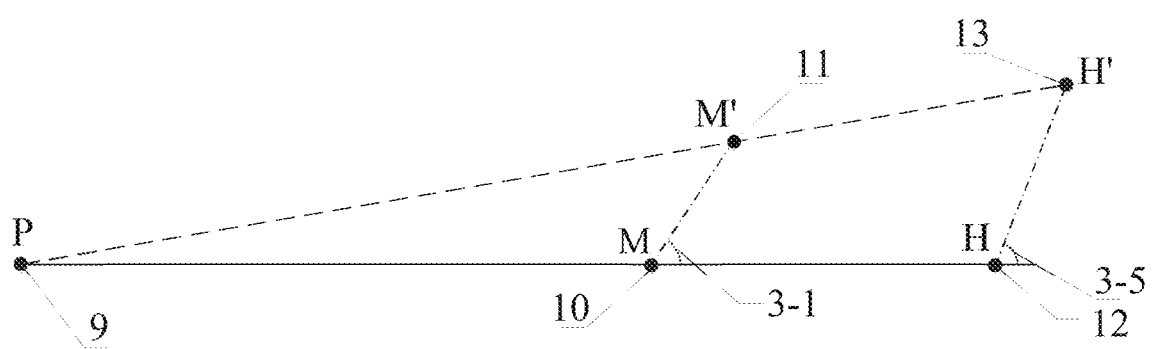
FIG. 2 is a mathematical model diagram of the main parts of the docking process extracted from FIG. 1.
Figure 3:
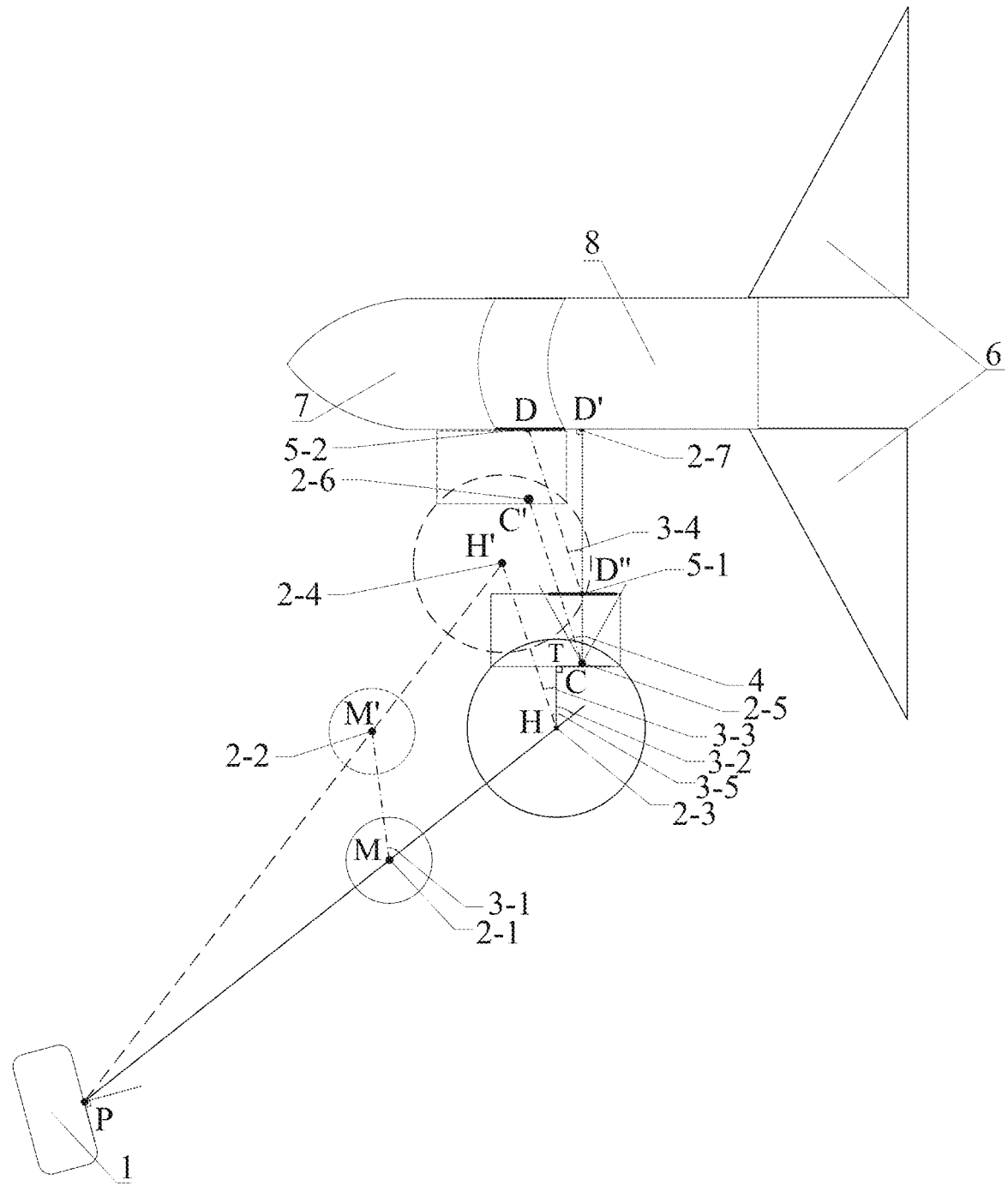
FIG. 3 is an explanatory view showing the docking process when the actual aircraft door and the upright pillar are on the same side of the bridgehead and the outside angle is ∠O=∠B+∠A.
Figure 4:
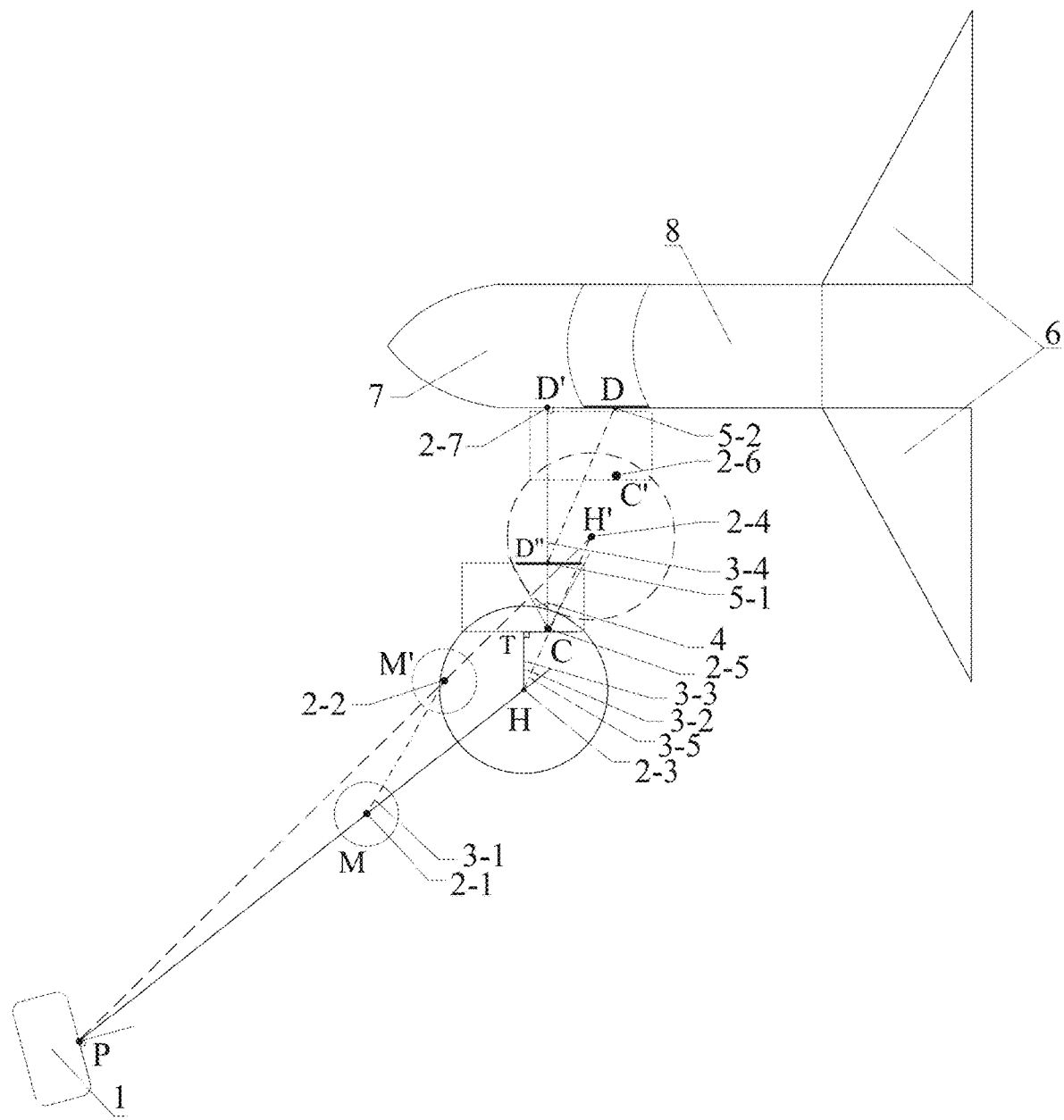
FIG. 4 is an explanatory view showing the docking process when the actual aircraft door and the upright pillar are on the opposite side of the bridgehead and the outside angle is ∠O=∠B−∠A.
Figure 5:
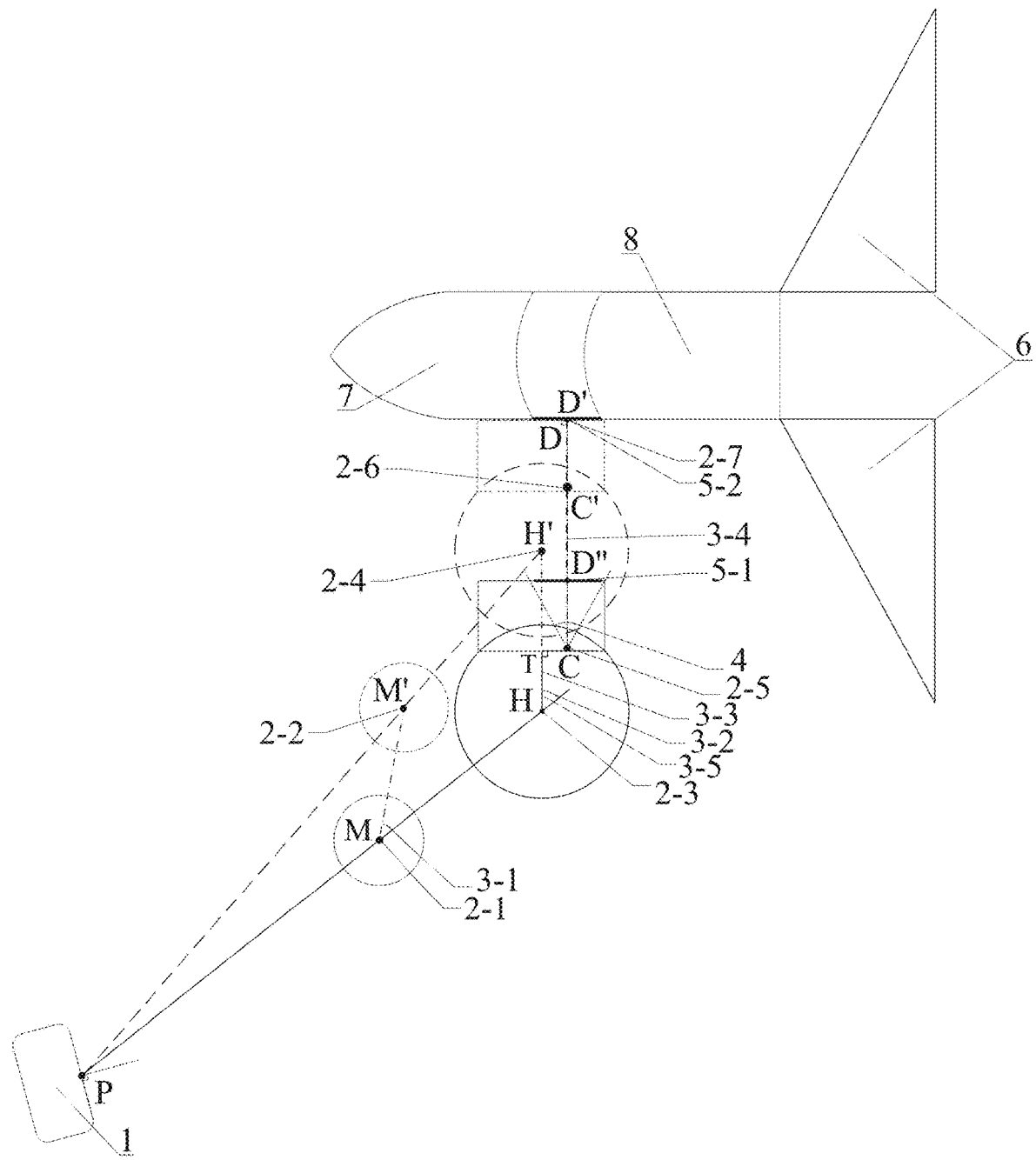
FIG. 5 is an explanatory view showing the docking process when the actual hatch is heading towards the bridgehead with an offset angle ∠A=0. At this time, the outside angle ∠O=∠B.
Figure 6:
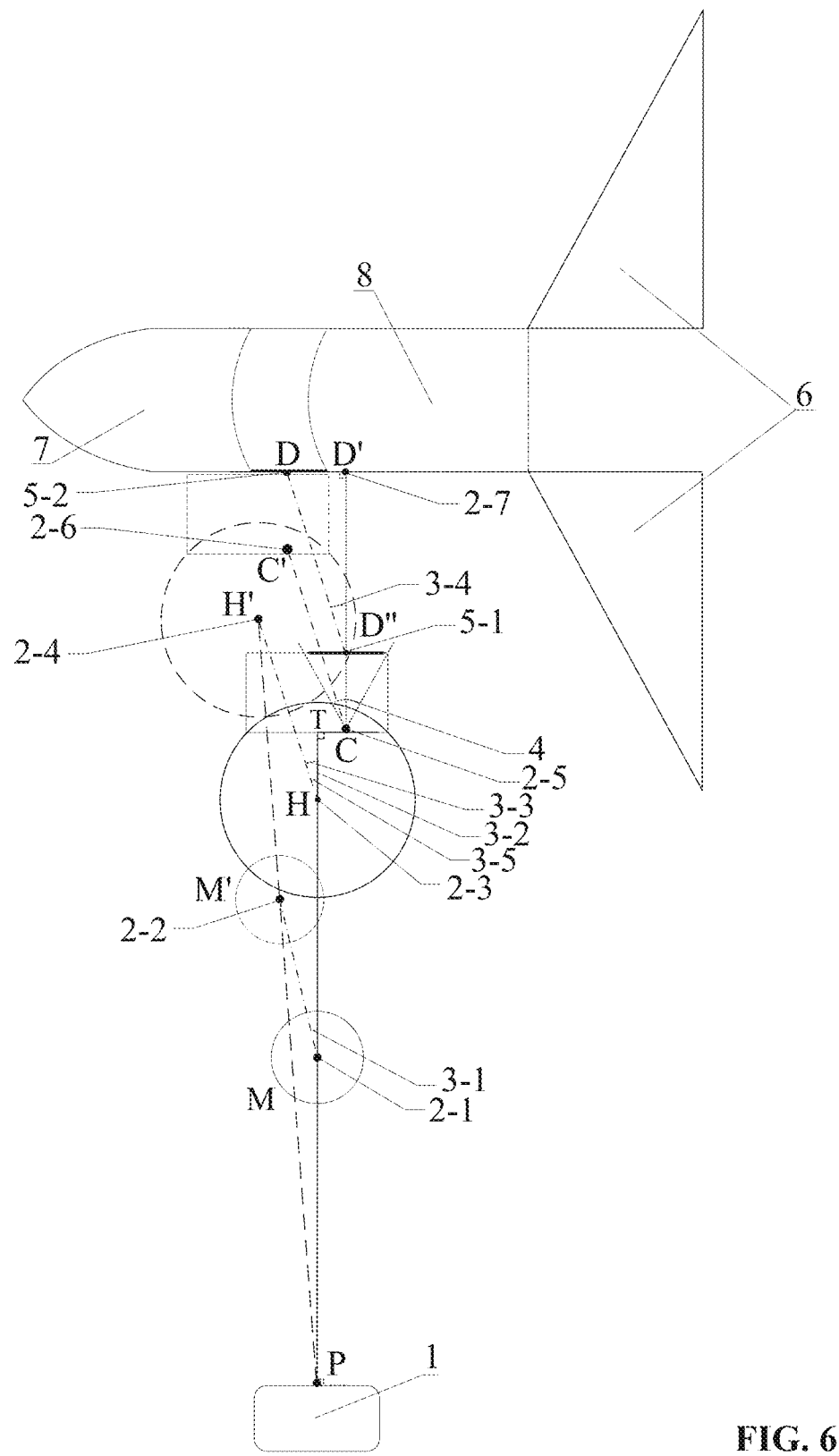
FIG. 6 is an explanatory view showing the docking process when the actual hatch is on the side of the bridge head, in the case where the bridge body angle and the bridge head angle are both zero. At this time, the outer angle is ∠O=∠A.
Figure 7:
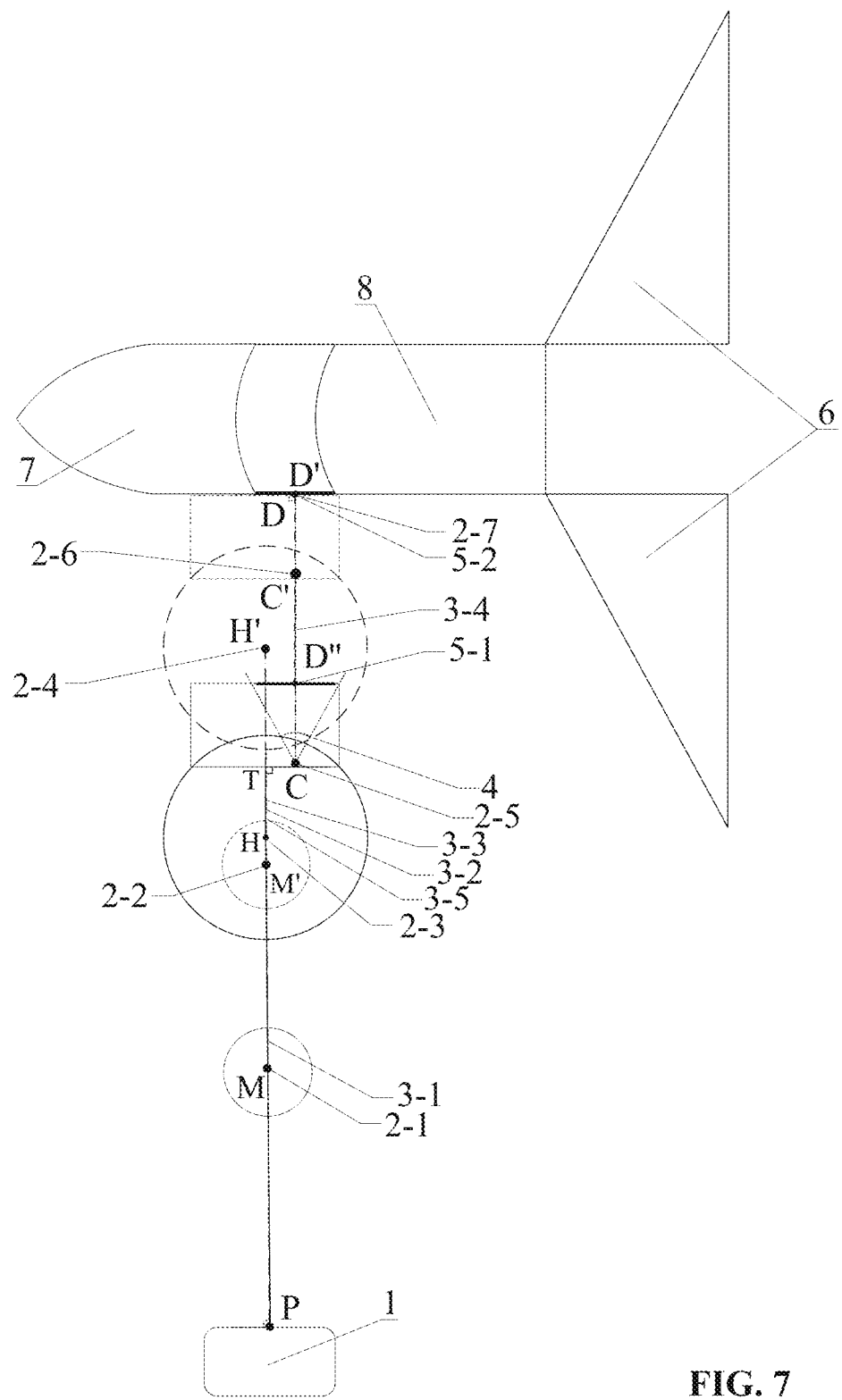
FIG. 7 is an explanatory view showing the docking process when the bridgehead is facing the center of the actual position of the cabin door and the bridge body angle and bridgehead angle are both zero. At this time, the outer angle ∠O=0, that is, the target wheel carrier angle is also zero.
Figure 8:
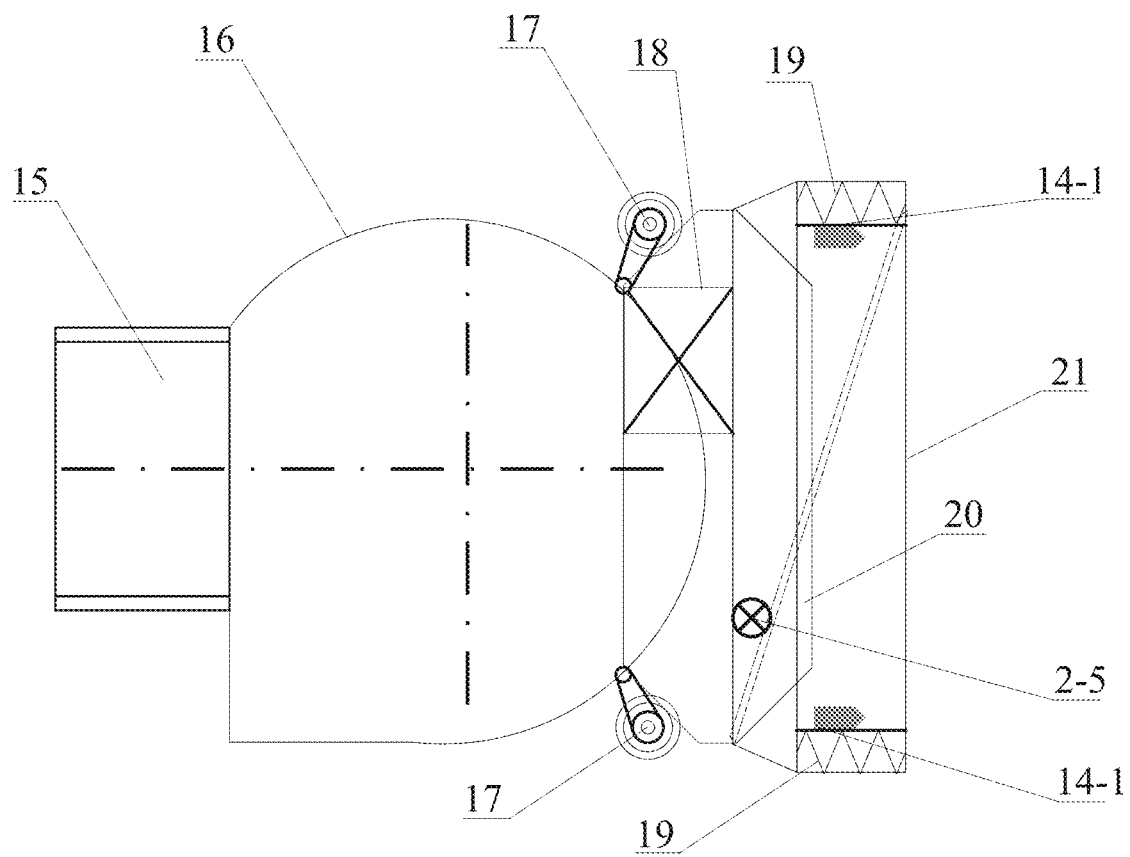
FIG. 8 is a top view of the recommended installation location of the ranging sensor and vision sensor.
Figure 9:
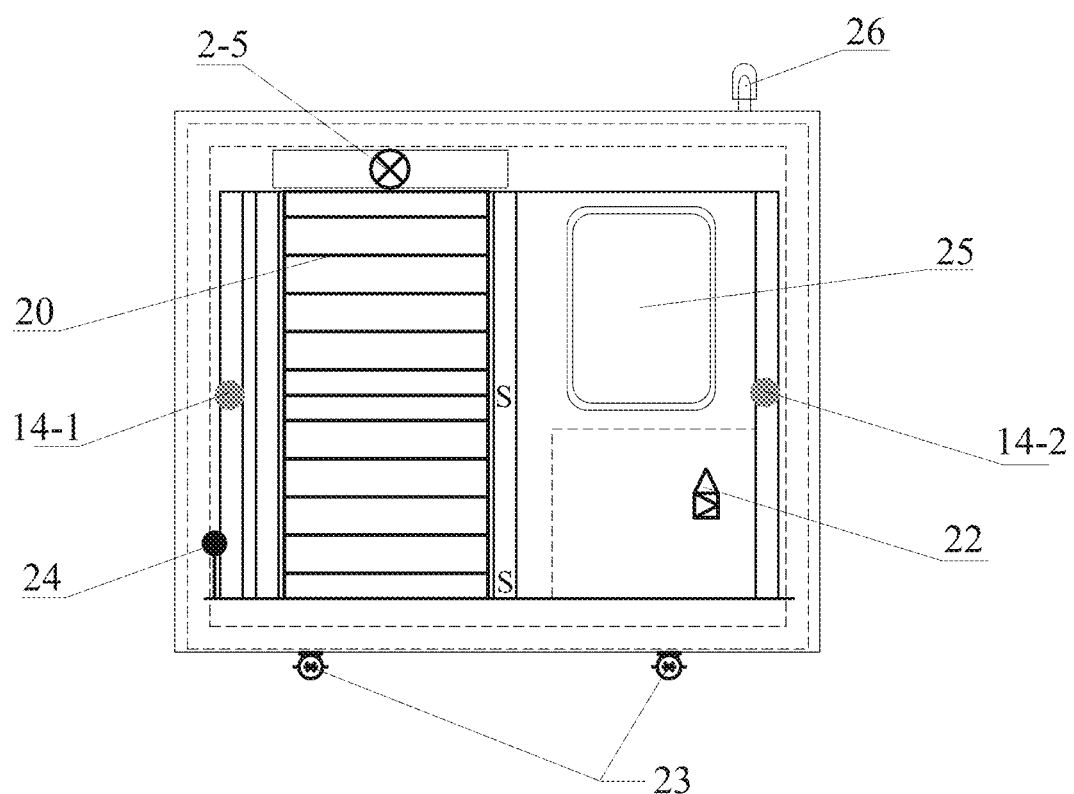
FIG. 9 is a front view of the recommended installation location of the ranging sensor and vision sensor.

In the drawings, the following reference numbers are used: 1. Upright pillar (Fixed point), 2-1. Wheel frame center point, 2-2. Expected wheel frame center point, 2-3. Bridgehead center point, 2-4. Expected bridgehead center point, 2-5. Camera installation position, 2-6. Expected camera position, 2-7. Expected the aircraft door center, 3-1. Expected wheel frame angle, 3-2. Bridgehead angle ∠B, 3-3. Bridgehead offset angle ∠A, 3-4. Expected bridgehead tilt angle, 3-5. Outer angle ∠O=(∠A+∠B), 4. Camera perspective, 5-1. Expected aircraft door position, 5-2. Actual position of aircraft door, 6. Aircraft wing, 7. Aircraft nose, 8. Aircraft fuselage, 9. Upright pillars fixed point, 10. Current point of wheel frame, 11. Wheel frame target point, 12. Current point of bridgehead, 13. Bridgehead target point, 14-1. Installation location for the right distance sensor, 14-2.

Installation location for the left distance sensor, 15. Aisle, 16. Bridgehead, 17. Side wall roller shutter, 18. Manual console, 19. Awnings, 20. Raised floor, 21. Pick-up platform, 22. Door protector, 23. Touch sensor, 24. Leveling wheel, 25. Front window, 26. Working lamp.

It will be obvious to those skilled in the art that changes and modifications may be made, and therefore, the aim in the appended claims is to cover all such changes and modifications.

What is claimed is:

1. A method for calculating an optimal wheel position control angle of a passenger boarding bridge automatic docking system, the method comprising:

S1. collecting ranging information of a sensor to rotate a bridgehead direction via a distance measuring sensor on both sides of the bridgehead of a passenger boarding bridge, making the bridgehead parallel to an aircraft fuselage;

S2. collecting information of an aircraft door by a camera at the bridge head of the passenger boarding bridge to obtain a center position D of the aircraft door; in an ideal docking situation, the aircraft door should appear at the bridge head position as D"; the position where D" is projected vertically onto the aircraft fuselage is D', that is, the line segment DD' is the horizontal distance deviation between the current passenger boarding bridge and the aircraft door, the line segment D'D" is the distance between the current boarding bridge and the aircraft fuselage;

S3. defining a center point of the boarding bridge head as H; after the boarding bridge is docked with the aircraft door, the center position of the boarding bridge head is H'; corresponding to the definition in S2, the line segment HH' is parallel and equal to the line segment DD"; then $\angle DD''D'$ is the angle at which the bridgehead offset, which is defined as $\angle A$;

S4. getting a distance MH from a center point M of the wheel frame to the center point H of the bridgehead, and obtaining a length PH of the bridge body, where point P is the column position of the boarding bridge; getting a current bridgehead angle $\angle B$; obtaining a corresponding value by a distance sensor and the bridgehead angle sensor on the passenger boarding bridge; the bridgehead angle $\angle B$ is the angle between the center line PH of the bridge body and the center line HT of the bridgehead; when HT is on the left side of PH, $\angle B$ is a positive angle. When HT is on the right side of PH, $\angle B$ is a negative angle;

S5. defining the center point of a target wheel carrier as M', $\angle HMM'$ is a control angle of a boarding bridge wheel position:

$$\angle HMM' = \pi - \arcsin\left(\frac{HH'^*\sin(\pi - \angle O) - \frac{MH^* HH'^*\sin(\pi - \angle O)}{\Sigma}}{(PH - MH)^2 + (\Sigma - MH)^2 - 2^*(PH - MH)^*}\right);$$

$$(\Sigma - MH)^* \sqrt{1 - \frac{(HH'^*\sin(\pi - \angle O))^2}{\Sigma^2}}$$

where, $\Sigma = \sqrt{(PH)^2 + HH'^2 - 2^*(PH)^* HH'^* \cos(\pi - \angle O)}$, $HH' = DD''$, $\angle O = \angle A + \angle B$, $DD'' = \sqrt{DD'^2 + D'D''^2}$, $\angle DD''D' = \arcsin\left(\frac{DD''^2 + D'D''^2 - DD'^2}{2*DD''*D'D''}\right)$;

and

S6. controlling a wheel position angle of the boarding bridge according to the control angle obtained in S5, and driving a walking mechanism to move until the docking of the boarding bridge and the aircraft door is realized.

* * * * *